United States Patent Office 2,979,519
Patented Apr. 11, 1961

2,979,519

NEW CYCLOTRISILOXANES

Ogden R. Pierce and George W. Holbrook, Midland, Mich., assignors to Dow Corning Corporation, Midland, Mich., a corporation of Michigan No Drawing. Filed June 27, 1956, Ser. No. 594,108

5 Claims. (Cl. 260—448.2)

This invention relates to cyclotrisiloxanes containing fluorine groups in the side chain.

The organopolysiloxane rubbers which have met with the greatest commercial success have been those which contain phenyl and methyl groups attached to the silicon atoms. The utility and versatility of these materials has been well established and they have found wide application in a multitude of industries. However, these rubbers have always suffered from one disadvantage, namely a high swell when subjected to certain fuel oils, lubricating oils and other organic solvents. It would be highly desirable, therefore, to obtain a siloxane rubber which avoided this objection without sacrificing any of the desirable properties inherent to methyl and phenyl organosilicon rubbers.

It is the primary object of this invention to provide novel compositions of matter which are particularly useful as intermediates in the preparation of organopolysiloxane rubbers.

This invention relates to cyclotrisiloxanes of the unit formula $$\text{RCH}_2\text{CH}_2\overset{\text{Me}}{\text{SiO}}$$

where R is a perfluoroalkyl radical of from 1 to 10 inclusive carbon atoms.

For the purpose of this invention R can be any perfluoroalkyl radical of from 1 to 10 inclusive carbon atoms such as $CF_3$, $C_2F_5$, $C_7F_{15}$ and $C_{10}F_{21}$. These perfluoroalkyl groups can be either straight or branch chained radicals.

The compositions of this invention may be prepared starting with the chlorosilanes of the formula $$\text{RCH}_2\text{CH}_2\overset{\text{Me}}{\text{SiCl}_2}$$

These in turn may be prepared by the reaction of an alkylene of the formula $RCH=CH_2$ with methyldichlorosilane in the presence of a peroxide or platinum catalyst at temperatures of from 150° to 300° C.

The chlorosilanes can be hydrolyzed in the conventional manner and the resulting hydrolyzate is then heated with an alkali metal hydroxide or an alkali metal salt of a siloxane under conditions which cause the cyclotrisiloxane to distill from the reaction mixture. If desired, this cracking can be carried out under a fractionating column which will return the higher boiling cyclics to the reaction zone. In this way the siloxane can be converted quantitatively to the cyclic trimer.

An alternative method which may be employed in those cases where the cyclic trimer is a crystalline material involves heating the crude hydrolyzate with the aforesaid alkaline catalysts under conditions where the volatile cyclic materials are removed by distillation. The cyclic trimer may then be crystallized from the distillate by cooling and the crystals removed by filtration. By repeating this process it is possible to obtain a high yield of the crystalline trimer.

In general the cracking operations for the preparation of the trimer range from 200° to 400° C. and may be carried out at reduced pressure or at atmospheric pressure. When the higher temperatures are employed, it is preferable that the operation be carried out in a nitrogen atmosphere.

It has been found that commercially successful rubbers cannot be prepared, by known methods, from the crude hydrolysis products of chlorosilanes of the formula $$\text{RCH}_2\text{CH}_2\overset{\text{Me}}{\text{SiCl}_2}$$

or from cyclosiloxanes of the formula $$(\text{RCH}_2\text{CH}_2\overset{\text{Me}}{\text{SiO}})_x$$

where $x$ is 4 or more. Consequently the cyclic trisiloxanes of this invention represent the only materials in this class of silicon compounds which can be polymerized to rubber grade polymers. The method of polymerizing the siloxanes of this invention to high polymers is fully described in the copending application of Oscar K. Johannson, Serial No. 594,107, filed simultaneously herewith and now abandoned. The excellence of the rubbers prepared from the compositions of this invention is shown in the copending application of Eric D. Brown, Serial No. 594,113, also filed simultaneously herewith. Both of said copending applications are hereby made a part of this specification by reference.

The following examples are illustrative only and should not be construed as limiting the invention which is properly delineated in the appended claims.

*Example 1*

1120 g. of $$\text{CF}_3\text{CH}_2\text{CH}_2\overset{\text{Me}}{\text{SiCl}_2}$$

was hydrolyzed with an excess of water at 0° C. The hydrolyzate was dissolved in ether, washed neutral and dried and the solvent was removed by evaporation.

4.4 g. of potassium hydroxide was added to the hydrolyzate and the mixture was heated under a fractionating column at a pressure of 8 mm. at a temperature of 190 to 200° C. 750 g. of the cyclotrisiloxane of the unit formula $$\text{CF}_3\text{CH}_2\text{CH}_2\overset{\text{Me}}{\text{SiO}}$$

was obtained. This material had a boiling point of 115° C. at 8 mm. pressure. When cooled it was a white, crystalline material. The super-cooled liquid had a refractive index at 25° C. of 1.3654.

*Example 2*

195 g. of $$\text{C}_2\text{F}_5\text{CH}_2\text{CH}_2\overset{\text{Me}}{\text{SiCl}_2}$$

was hydrolyzed with waetr and the hydrolyzate was washed neutral and then heated with potassium hydroxide under a fractionating column to remove the cyclotrisiloxane. The product was a liquid material having the formula $$(\text{C}_2\text{F}_5\text{CH}_2\text{CH}_2\overset{\text{Me}}{\text{SiO}})_3$$

which boiled at 129° C. at 11 mm. pressure and had a refractive index at 25° C. of 1.3501.

*Example 3*

The compound $$\text{C}_3\text{F}_7\text{CH}_2\text{CH}_2\overset{\text{Me}}{\text{SiCl}_2}$$

was hydrolyzed as in Example 2. The resulting hydrolyzate was heated with lithium hydroxide at a temperature of 200 to 230° C. at reduced pressure. The distillate obtained was then reheated with additional lithium hydroxide at 400° C. at atmospheric pressure in an atmosphere of nitrogen. The distillate was cooled to 0° C. whereupon a crystalline fraction was formed. This was removed by filtration and was shown to have the formula $$(C_3F_7CH_2CH_2\overset{Me}{Si}O)_3$$

This compound melted at 59 to 60° C. and had a boiling point of 128° C. at .4 mm.

That which is claimed is:

1. A cyclic trisiloxane of the unit formula $$RCH_2CH_2\overset{Me}{Si}O$$

where Me represents a methyl radical and R is a perfluoroalkyl radical of from 1 to 10 inclusive carbon atoms.

2. A cyclic trisiloxane of the unit formula $$CF_3CH_2CH_2\overset{Me}{Si}O$$

where Me represents a methyl radical.

3. A cyclic trisiloxane of the unit formula $$C_2F_5CH_2CH_2\overset{Me}{Si}O$$

where Me represents a methyl radical.

4. A composition of matter consisting essentially of a cyclic trisiloxane having the formula $$[CF_3CH_2CH_2(CH_3)SiO]_3$$

5. A method for producing cyclic trisiloxanes of the formula $$[RCH_2CH_2\overset{Me}{Si}O]_3$$

in which Me represents a methyl radical and each R is a perfluoroalkyl radical of no more than 10 carbon atoms, said method consisting essentially of heating a mixture consisting essentially of higher polymers of the unit formula $$RCH_2CH_2\overset{Me}{Si}O$$

with a catalyst selected from the group consisting of alkali metal hydroxides and alkali metal salts of siloxanes under conditions of temperature and pressure at which the aforesaid cyclic trisiloxane will distill from the reaction mixture and at which higher boiling cyclics will return to the reaction mixture.

References Cited in the file of this patent

UNITED STATES PATENTS

| | | |
|---|---|---|
| 2,455,999 | Hyde | Dec. 14, 1948 |
| 2,651,651 | Simons et al. | Sept. 8, 1953 |
| 2,686,194 | Passino et al. | Aug. 10, 1954 |
| 2,715,113 | Gordon | Aug. 9, 1955 |
| 2,860,152 | Fletcher | Nov. 11, 1958 |

OTHER REFERENCES

Rochow: "An Introduction to the Chemistry of the Silicones," 2nd edition. John Wiley and Sons, Inc., New York (1951), pages 79–80.

Pierce et al.: Journal American Chemical Society, volume 75 (November 1953), pages 5618–5620.

Clark: "Elastomeric Fluoroalkyl Siloxane Copolymers," Wright Air Development Center Technical Report 54–213 (July 1954), pp. 11 and 10.

McGregor: "Silicones and Their Uses," McGraw-Hill Book Co., Inc., New York (1954), pages 268–272.

McBee et al.: "Journal American Chemical Society," volume 77, pages 1292–1293 (March 1955).

Tarrant: "Development of Fluoro-Silicone Elastomers," Wright Air Development Center Technical Report 55–220 (August 1955), pages 12 and 37.